Patented Oct. 8, 1940

2,217,614

UNITED STATES PATENT OFFICE 2,217,614

TERPENE-CYANOACYL COMPOUND AND METHOD OF PRODUCING SAME

Joseph N. Borglin, Wilmington, Del., assignor to Hercules Powder Company, Wilmington, Del., a corporation of Delaware No Drawing. Application December 27, 1939, Serial No. 311,168

17 Claims. (Cl. 260—454)

This invention relates to a method for the production of thiocyanoacyl, selenocyanoacyl, and tellurocyanoacyl esters from monocyclic terpene hydrocarbons and to the resulting products.

By the method in accordance with this invention, I react an unsaturated monocyclic terpene hydrocarbon with a halogenated organic acid and then with a metal thiocyanate, a metal selenocyanate, or a metal tellurocyanate which is reacted upon under the conditions employed.

The terpene hydrocarbon which I may utilize may be any unsaturated monocyclic terpene hydrocarbon such as, for example, dipentene, terpinolene, terpinene, phellandrene, menthene, limonene, sylvestrene, etc. Terpene cuts rich in unsaturated monocyclic terpene hydrocarbons may be utilized. Commercial terpene cuts frequently consist of mixtures of several of the hydrocarbons hereinabove mentioned, and such cuts may be utilized according to the method of this invention.

The halogenated organic acid which I use may be, for example, monochloroacetic acid, dichloroacetic acid, trichloroacetic acid, alpha-chloropropionic acid, beta-chloropropionic acid, alpha-chlorobutyric acid, beta-chlorobutyric acid, gamma-chlorobutyric acid, a chlorovaleric acid, a chlorocaproic acid, chlorolauric acid, chloromyristic acid, chloropalmitic acid, chlorostearic acid, chloroleic acid, chlororicinoleic acid, chlorolinoleic acid, chloroerucic acid, chlorobenzoic acid, a chloronaphthenic acid, chloromalonic acid and chlorophthallic acid, etc., and the corresponding bromine, fluorine and iodine substituted acids. If desired, mixtures may be used.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, calcium thiocyanate, etc. When it is desired to make a selenocyanoacylate, the metal selenocyanate I may use, may be, for example, sodium selenocyanate, potassium selenocyanate, lithium selenocyanate, ammonium selenocyanate, calcium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The unsaturated monocyclic terpene hydrocarbon will first be reacted with a halogenated acid and the resulting halogen acid ester or esters of the terpene isolated from any by-products of the reaction; preferably excess acid is also removed. The second stage of the reaction is the treatment of the halogenated acid ester of the terpene with the metal thiocyanate, selenocyanate, or tellurocyanate as the case may be followed by recovery of the product. I may carry out each of the steps in the presence of a suitable inert solvent and in fact I prefer to use an inert solvent such as, for example, methanol, ethanol, propanol, butanol, acetone, ethyl acetate, etc., in the second stage. Each step may be carried out at any temperature within the range of about 0° C. to about 250° C., preferably within the range of about 30° C. to about 180° C.

When monocyclic terpenes are subjected to the conditions of the acylating reaction, a mixture of terpene products is inevitably produced because of the tendency of the monocyclic terpenes to rearrange. Thus, by the method in accordance with the present invention, the product obtained consists of a mixture of several thiocyanoacyl, selenocyanoacyl, or tellurocyanoacyl terpene esters. Terpinyl, fenchyl, bornyl, and isobornyl esters will usually be present. As a rule, one or two of these esters will be in predominance depending upon the particular terpene hydrocarbon reacted upon, the acid utilized, and the conditions of the reaction. In addition, unacylated terpene hydrocarbons will usually be present in the product.

The halogen substituted acylates of the first stage reaction are light in color if the reaction is carried out in the absence of oxygen, for example, under a blanket of $CO_2$. Substantially water-white esters may be obtained by vacuum distillation. The color of the thiocyanoacylate products follows the color of the first stage ester from which they are prepared. Where very light-colored products are desired and where it is desired to insure products of no odor or minimum odor, the first stage reaction may be conducted, if desired, in a non-oxidizing atmosphere, or the first stage product may be vacuum distilled, or both these measures may be taken.

The method in accordance with this invention will be further illustrated by the examples which follow. All parts and percentages are by weight unless otherwise specified.

*Example 1*

A mixture of 27.2 parts of terpinolene and 37.8 parts of chloroacetic acid was heated for five days in an oil bath, the temperature of which was held at about 180° C. Carbon dioxide was bubbled slowly through the reaction mixture during this period. The resulting mixture was dissolved in benzene and the solution washed repeatedly with water. The solvent was then removed by distillation at reduced pressure. A yield of 25.3 parts of chloroacetate esters was recovered.

23.5 parts of this product were dissolved in 40 parts of 95% ethyl alcohol and 18 parts of sodium thiocyanate were added. The mixture was refluxed for one hour. About 80 parts of commercial heptane and 100 parts of water were then added and after thorough shaking, the layers were separated. The heptane solution was washed three times with water. Volatile solvents were then removed by distillation at a reduced pressure. A yield of 22 parts of product containing the thiocyanoacetates derived from terpinolene was obtained.

*Example 2*

A mixture of 27.2 parts of dipentene and 50.1 parts of alpha-bromobutyric acid was heated for 20 hours at a 125° C. and for 6 hours at 155° C. under a blanket of carbon dioxide. The reaction mass was then taken up in 70 parts of commercial heptane and 40 parts of benzene and the resulting solution washed with water until free of excess bromobutyric acid. The solvents were then removed by distillation at reduced pressure. A yield of 49.4 parts of bromobutyric esters having a bromine content of 27.5% was obtained.

47.5 parts of this product were dissolved in 80 parts of 95% ethyl alcohol and 25 parts of sodium thiocyanate were added. The mixture was refluxed for one hour. It was then mixed with about an equal volume of heptane and the solution washed with water until free of sodium thiocyanate. The volatile solvents were then removed by distillation at reduced pressure. A yield of 23.2 parts of product containing the thiocyanobutyrates derived from pinene were obtained. The product has a sulfur content of 6.7% and a residual bromine content of 2%.

The products of the examples contain unesterified terpene compounds and petroleum hydrocarbons in varying proportion. A certain portion of the original reactant is usually not esterified and, in addition, there may be some conversion of esters to terpene hydrocarbons in the second stage. The unesterified terpene compounds and petroleum hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the product, for example, by thorough washing of a petroleum ether solution with water.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. As has been mentioned hereinabove, a mixture of esters is obtained by the method of this invention. The mixed nature of the esters obtained in accordance with this invention makes them valuable in insecticides which are intended to be used against a wide variety of insects since insects vary considerably in resistance to specific toxic agents. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification.

The term "aromatic" as used herein includes any radical containing a benzene linkage in its structure.

This application is a continuation-in-part of my previous application, Serial No. 198,687, filed March 29, 1938, entitled "Terpene-cyanoacyl compounds and methods of producing same."

It will be understood that the details and examples hereinbefore set forth are illustrative only, and the invention as broadly described and claimed is in no way limited thereby.

What I claim and desire to protect by Letters Patent is:

1. A method for the preparation of terpene thiocyanoacylates, selenocyanoacylates, and tellurocyanoacylates which comprises reacting an unsaturated monocyclic terpene hydrocarbon with a halogenated carboxylic acid and then with a compound selected from the group of metal thiocyanates, metal selenocyanates, and metal tellurocyanates which are at least partially soluble in the reaction mixture.

2. A method for the preparation of terpene thiocyanoacylates which comprises reacting an unsaturated monocylic terpene hydrocarbon with a halogenated carboxylic acid and then with a metal thiocyanate which is at least partially soluble in the reaction mixture.

3. A method for the preparation of terpene thiocyanoacylates which comprises reacting an unsaturated monocyclic terpene hydrocarbon with a halogenated aliphatic carboxylic acid and then with a metal thiocyanate which is at least partially soluble in the reaction mixture.

4. A method for the preparation of terpene thiocyanoacylates which comprises reacting an unsaturated monocyclic terpene hydrocarbon with a halogenated lower fatty acid and then with a metal thiocyanate which is at least partially soluble in the reaction mixture.

5. A method for the preparation of terpene thiocyanoacylates which comprises reacting an unsaturated monocyclic terpene hydrocarbon with a chlorinated lower fatty acid and then with an alkali metal thiocyanate.

6. A method for the preparation of terpene thiocyanoacylates which comprises reacting an unsaturated monocyclic terpene hydrocarbon with a brominated lower fatty acid and then with an alkali metal thiocyanate.

7. A method for the preparation of terpene thiocyanoacylates which comprises reacting an unsaturated monocyclic terpene hydrocarbon with chloroacetic acid and then with an alkali metal thiocyanate.

8. A mixture of terpene esters having the type formula ROOCR'XCN in which R is a terpene radical, R' is a radical selected from the group consisting of aliphatic and aromatic radicals, and X is a member of the group consisting of sulfur, selenium and tellurium, the said mixture being the product of a reaction of an unsaturated monocyclic terpene hydrocarbon with a halogen substituted carboxylic acid and thereafter with a compound selected from the group consisting of metal thiocyanates, metal selenocyanates, and metal tellurocyanates, which is at least partially soluble in the reaction mixture.

9. A mixture of terpene esters having the type formula ROOCR'XCN in which R is a terpene radical, R' is a radical selected from the group consisting of aliphatic and aromatic radicals, and X is a member of the group consisting of sulfur, selenium and tellurium, the said mixture being the product of a reaction of dipentene with a halogen substituted carboxylic acid and thereafter with a compound selected from the group consisting of metal thiocyanates, metal selenocyanates, and metal tellurocyanates which is at least partially soluble in the reaction mixture.

10. A mixture of terpene esters having the type formula ROOCR'XCN in which R is a terpene radical, R' is a radical selected from the group consisting of aliphatic and aromatic radicals, and X is a member of the group consisting of sulfur, selenium and tellurium, the said mixture being the product of a reaction of terpinene with a halogen substituted carboxylic acid and thereafter with a compound selected from the group consisting of metal thiocyanates, metal selenocyanates, and metal tellurocyanates which is at least partially soluble in the reaction mixture.

11. A mixture of terpene esters having the type formula ROOCR'XCN in which R is a terpene radical, R' is a radical selected from the group consisting of aliphatic and aromatic radicals, and X is a member of the group consisting of sulfur, selenium and tellurium, the said mixture being the product of a reaction of terpinolene with a halogen substituted carboxylic acid and thereafter with a compound selected from the group consisting of metal thiocyanates, metal selenocyanates, and metal tellurocyanates which is at least partially soluble in the reaction mixture.

12. A mixture of terpene thiocyanoacylates, the said mixture being the product of a reaction of dipentene with a halogenated lower fatty acid and thereafter with a metal thiocyanate which is at least partially soluble in the reaction mixture.

13. A mixture of terpene thiocyanoacylates, the said mixture being the product of a reaction of terpinene with a halogenated lower fatty acid and thereafter with a metal thiocyanate which is at least partially soluble in the reaction mixture.

14. A mixture of terpene thiocyanoacylates, the said mixture being the product of a reaction of terpinolene with a halogenated lower fatty acid and thereafter with a metal thiocyanate which is at least partially soluble in the reaction mixture.

15. A mixture of terpene thiocyanoacylates, the said mixture being the product of the reaction of dipentene with chloroacetic acid and thereafter with an alkali metal thiocyanate.

16. A mixture of terpene thiocyanoacylates, the said mixture being the product of the reaction of terpinene with chloroacetic acid and thereafter with an alkali metal thiocyanate.

17. A mixture of terpene thiocyanoacylates, the said mixture being the product of the reaction of terpinolene with chloroacetic acid and thereafter with an alkali metal thiocyanate.

JOSEPH N. BORGLIN.